(12) United States Patent
Collins

(10) Patent No.: US 6,463,342 B1
(45) Date of Patent: Oct. 8, 2002

(54) METHOD FOR PREVENTING COMPUTER DOWN TIME

(75) Inventor: Dave Roy Collins, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/552,233

(22) Filed: Apr. 19, 2000

(51) Int. Cl.⁷ ................................................. G05B 9/02
(52) U.S. Cl. ........................ 700/82; 700/79; 707/204; 714/6; 714/13
(58) Field of Search .............................. 700/79, 82, 95, 700/97; 707/204; 714/6, 13, 100; 711/162

(56) References Cited

U.S. PATENT DOCUMENTS

| | | | | |
|---|---|---|---|---|
| 4,770,122 A | * | 9/1988 | Ichihashi et al. | 118/697 |
| 4,917,228 A | * | 4/1990 | Ichihashi et al. | 198/347.4 |
| 4,931,944 A | * | 6/1990 | Richter et al. | 700/100 |
| 6,141,598 A | * | 10/2000 | Nam | 700/95 |
| 6,238,746 B1 | * | 5/2001 | Fukuoka et al. | 427/424 |

* cited by examiner

Primary Examiner—Thomas Black
Assistant Examiner—Ronald D Hartman, Jr.

(57) ABSTRACT

A method for preventing computer down time, particularly relative to painting processes for vehicles. The method includes dividing the order into groups based on color, painting them in color order, and then sequencing them into the original build order. Between each different color, a paint purging process occurs. A primary computer is used to control the entire process. To insure continuous function, a secondary computer is provided in the event of primary computer failure. The functional status of the secondary computer is constantly monitored. As long as the secondary computer is functional, the primary computer will update the secondary computer. If the secondary computer is not functional, the primary computer updates itself.

16 Claims, 2 Drawing Sheets

METHOD FOR PREVENTING COMPUTER DOWN TIME

TECHNICAL FIELD

The present invention relates generally to assembly processes and, more particularly, to a method for preventing computer down time.

BACKGROUND ART

Computers run many critical systems. It is typical in these critical systems to use two identical computers to reduce the probability of system failure. A primary computer runs the critical system, while a secondary computer acts as a back up computer in case the primary computer fails.

One example of this is the painting process in an assembly plant. A sequencer/re-sequencer (ASR) changes the order of vehicles in an assembly plant between the paint shop and final assembly. The computers responsible for running the ASR need to access a single database. In order to insure that either computer is capable of running the ASR, the primary computer will occasionally back-up the database to the secondary computer. This is done so that the secondary computer is capable of running the ASR if the primary computer fails. Unfortunately, if the secondary computer fails, the primary computer can not back-up the database to the secondary computer. This results in the primary computer experiencing a fatal error causing the ASR to become inoperative.

The disadvantages associated with conventional data storage techniques have made it apparent that a new technique for preventing computer down time is needed. The new technique should be able to back up computer data during secondary computer failure. The new technique should also allow primary computer to function during secondary computer failure.

SUMMARY OF THE INVENTION

It is an object of the invention to provide an improved and reliable means for preventing computer down time, particularly in the painting process for consumer products. Another object of the invention is to back up computer data during a secondary computer failure.

In accordance with the objects of this invention, a method for preventing computer down time is provided. In one aspect of the invention, a method for preventing computer down time, particularly relative to painting processes for vehicles, includes dividing the order into groups based on color, painting them in color order, and then sequencing them into the original build order. Between each different color, a paint purging process occurs.

A primary computer is used to control the entire process. To insure continuous function, a secondary computer is provided in the event of primary computer failure. The functional status of the secondary computer is constantly monitored. As long as the secondary computer is functional, the primary computer will update the secondary computer. If the secondary computer is not functional, the primary computer updates itself.

The present invention achieves an improved and reliable means for preventing computer down time. Also, the present invention is advantageous in that it allows the primary computer to function during secondary computer failure.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
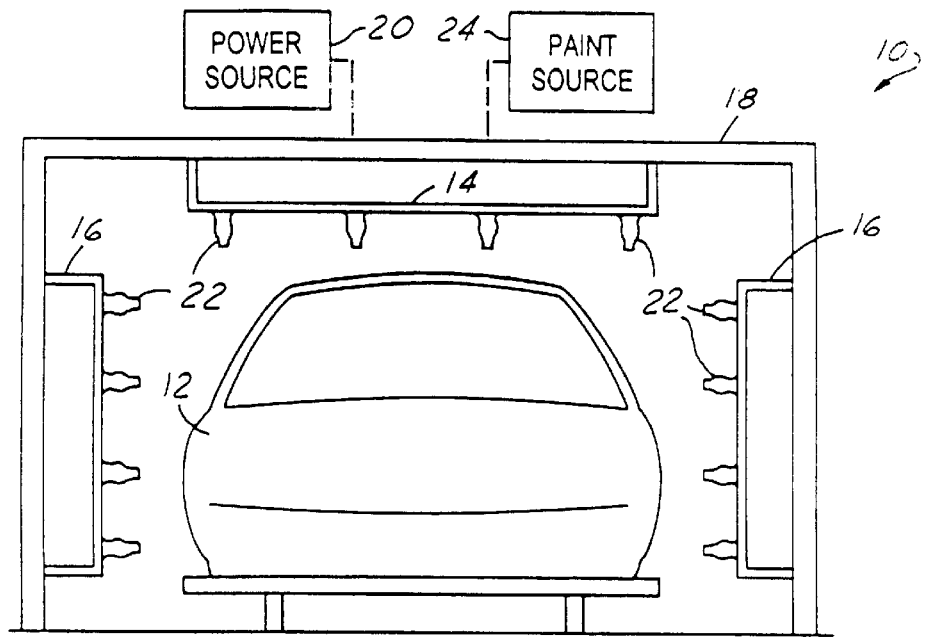
FIG. 1 is a depiction of a paint spray system according to one embodiment of the present invention.

In the following figures, the same reference numerals will be used to identify identical components in the various views. The present invention is illustrated with respect to a painting process particularly suited for the automotive field. However, the present invention is applicable to various other uses that may require preventing computer down time.

Referring to FIG. 1, a paint spray system 10 according to one embodiment of the present invention is illustrated. System 10 includes a plurality of robotic arms that may include an overhead arm 14 and side arms 16. Each arm 14, 16 is coupled to a rack 18. In such systems, arms 14, 16 move according to XYZ coordinates with respect to rack 18. Commonly, the XYZ coordinates of arms 14, 16 vary depending upon the part 12 to be painted. It is common, for example, to maintain a predetermined distance from the surface to be painted. Each arm 14, 16 has a plurality of motors (not shown) that permit movement of the arms 14, 16 into desired positions with respect to part 12. A power source 20 is coupled to paint spray system 10 to power arms 14, 16. Each arm 14, 16 has a paint atomizer head 22 positioned thereon. As will be further described below, each paint atomizer head 22 generates a desired paint spray with respect to part 12. Each paint atomizer head 22 is fluidically coupled to a paint source 24 that supplies paint thereto.

Each time a new color of paint is required, the current color paint present in paint atomizer head 22 needs to be purged. The process of changing paint colors requires several steps. First, paint source 24 is decoupled from paint head 22 and the paint drained. Next, paint head 22 is coupled to a paint solvent and is flushed with the paint solvent until all paint is removed. The paint solvent is then decoupled from paint head 22 and the solvent is drained. Finally, the new paint source 24 is coupled to paint head 22 and paint head 22 is activated until all paint solvent is removed.

Figure 2:
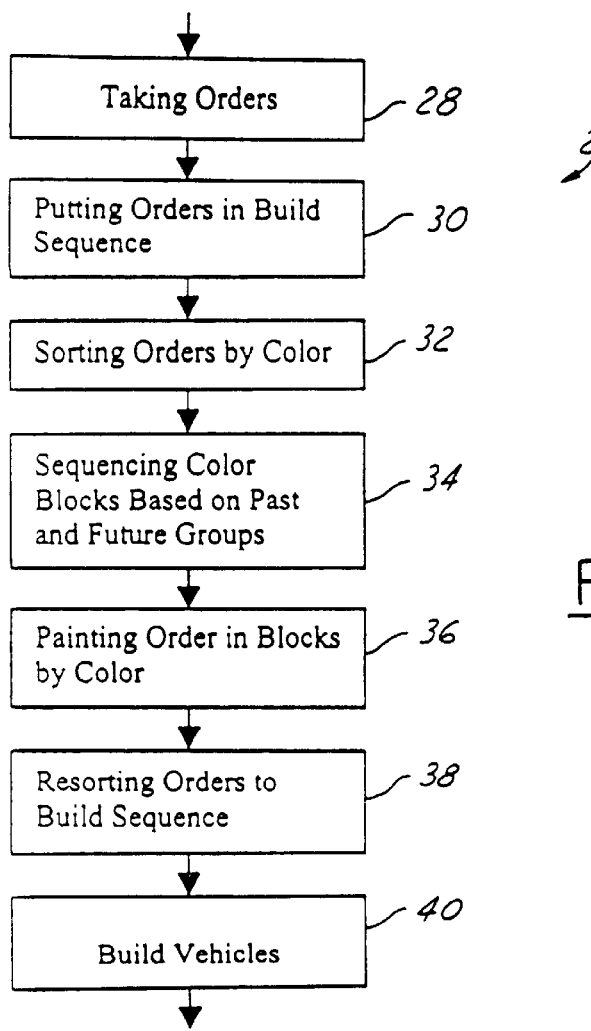
FIG. 2 is a block diagram of a method for reducing retooling costs according to one embodiment of the present invention.

Referring to FIG. 2, a block diagram of a method 26 for reducing retooling costs according to one embodiment of the present invention is illustrated. Method 26 begins with step 28 by offering at least two versions of a consumer product to a plurality of consumers. One example of this would be offering a plurality of different colors of vehicle (such as trucks) to a plurality of consumers. Once these vehicles are offered to the public, a plurality of orders for the consumer products is collected. A product order sequence is then generated based upon the plurality of orders in step 30.

The sequence then proceeds to step 32 where the product order sequence is delivered to an assembly plant. A current portion of the product order sequence is analyzed to determine a current number of different versions of the consumer product included in the current portion. One example of this would be analyzing one hundred current vehicle orders from the product order sequence to determine the number of different colors present in those one hundred orders. This portion is then sorted by version to generate a current optimized product sequence in step 32. The resulting current optimized product sequence groups all of the same versions together. Continuing with the above example, assume that in the one hundred vehicle orders there are fifty white, thirty black, and twenty red trucks randomly distributed among the orders. The current optimized product sequence would group all white trucks together, all black trucks together, and all red trucks together. In this way, the paint line only needs to be retooled (paint purged) twice for one hundred vehicles, instead of after every vehicle.

In another aspect of the invention, the first and final grouping of the current optimized product sequence may be determined by the past and future optimized product sequences in step 34. Similar to the above process, past and future portions may be analyzed and sorted to generate past and future optimized product sequences. In this way, the first group of the current optimized product sequence is selected to correspond to the final group of the past optimized product sequence. Likewise, the final group of the current optimized product sequence is selected to correspond to the first group of the future optimized product sequence. For example, if the current optimized product sequence begins with a group of vehicles painted red and ends with a group of vehicles painted white, then the previous (past) group would have ended with a group of vehicles painted red and the next (future) group would begin with a group of vehicles to be painted white. In this way, retooling between portions is eliminated.

The sequence then proceeds to step 36 where the consumer products are processed in the order determined by the current optimized product sequence. In the present example, the one hundred vehicles are painted. As each new version is required, the assembly line is retooled. In the present invention, when a new color is required the paint is purged and replaced with the new color paint.

The sequence then proceeds to step 38 where the current optimized product sequence is resorted to approximately the original sequence of the product order sequence. This allows the assembly plant to build vehicles in the sequence in which they were ordered in step 40. In the present invention, as each vehicle is produced it is stored in a storage and retrieval building. After the one hundred vehicles are painted they are resorted to the original sequence and sent to final assembly.

Figure 3:
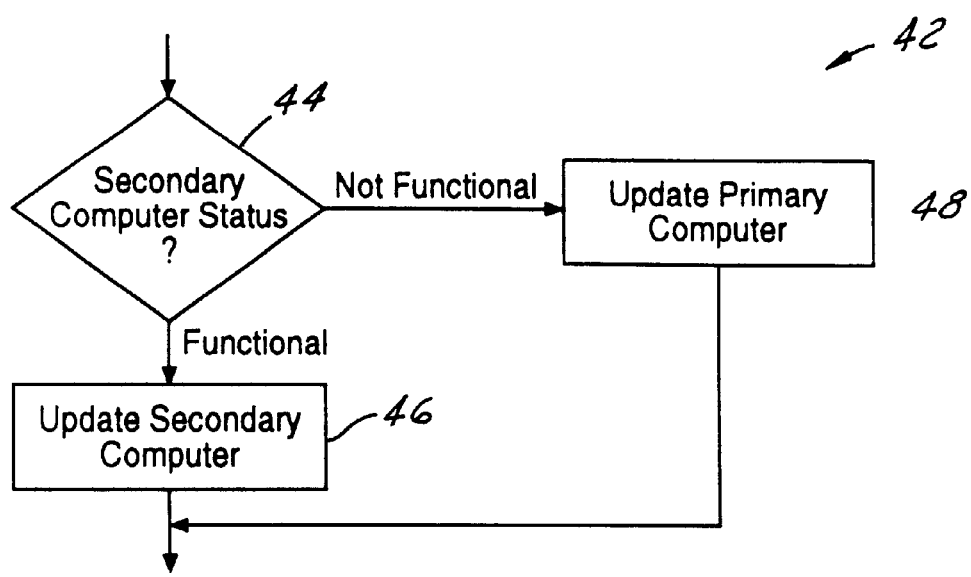
FIG. 3 is a block diagram of a method for preventing computer down time according to one embodiment of the present invention.

Referring to FIG. 3, a block diagram of a method 42 for preventing computer down time according to one embodiment of the present invention is illustrated. Method 42 for preventing computer down time modifies method 26 for reducing retooling costs by inserting additional steps between step 38 and step 40. In one aspect of the present invention, a critical system, such as an ASR, includes at least two computers. One of the computers is a primary computer for running the ASR, while the remaining computer is a secondary computer used as a back up in case the primary computer fails.

In order to insure constant operation, the secondary computer is constantly updated with the current database contained in the primary computer so that it is capable of running the critical system when the primary computer fails. To do this, the primary computer will occasionally back-up the database to the secondary computer. If the secondary computer fails, then the primary computer will backup the database to itself and not experience a fatal error.

Method 22 begins with step 44 by monitoring the status of the secondary computer to determine if it is functional. If the secondary computer is functional, then the sequence proceeds to step 46 where the primary computer updates the secondary computer to a primary computer state. This allows the secondary computer to replace the primary computer if the primary computer fails. If the secondary computer is not functional, then the sequence proceeds to step 48 where the primary computer updates itself to a primary computer state. This prevents the primary computer from experiencing a fatal error.

The method and system of the present invention prevents computer down time. Additionally, the present invention backs up computer data during secondary computer failure while allowing the primary computer to function during secondary computer failure.

From the foregoing, it can be seen that there has been brought to the art a new and improved method for preventing computer down time. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method for preventing computer down time comprising the steps of:

analyzing a current portion of a product order sequence using a primary computer to determine a current number of different versions of a consumer product included in said current portion, wherein said current portion includes at least two versions of said consumer product;

sorting said current portion of said product order sequence using said primary computer to generate a current optimized product sequence, whereby each of said current number of different versions are grouped together;

processing said consumer products in the order determined by said current optimized product sequence;

retooling an assembly line between said current number of different versions;

resorting said current optimized product sequence back into said product order sequence using said primary computer;

monitoring a status of a secondary computer to determine functionality of said secondary computer;

updating a secondary computer to a primary computer state when said secondary computer is functional, whereby said secondary computer is capable of replacing said primary computer; and updating said primary computer to a primary computer state when said secondary computer is not functional.

2. The method for preventing computer down time as recited in step 1, further comprising the step of offering said consumer product with said at least two versions to a plurality of consumers.

3. The method for preventing computer down time as recited in step 2, further comprising the step of collecting a plurality of orders for said consumer product from said plurality of consumers.

4. The method for preventing computer down time as recited in step 3, further comprising the step of generating said product order sequence based upon said plurality of orders.

5. The method for preventing computer down time as recited in step 1, further comprising the step of analyzing a past portion of said product order sequence to determine a past number of different versions of said consumer product included in said past portion.

6. The method for preventing computer down time as recited in step 5, further comprising the step of sorting said past portion of said product order sequence to generate a past optimized product sequence, whereby each of said at least two versions are grouped together.

7. The method for preventing computer down time as recited in step 6, wherein a version of a current first group of said current optimized product sequence is the same version as a version of a past final group of said past optimized product sequence.

8. The method for preventing computer down time as recited in step 1, further comprising the step of analyzing a future portion of said product order sequence to determine a future number of different versions of said consumer product included in said future portion.

9. The method for preventing computer down time as recited in step 8, further comprising the step of sorting said future portion of said product order sequence to generate a future optimized product sequence, whereby each of said at least two versions are grouped together.

10. The method for preventing computer down time as recited in step 9, wherein a version of a current final group of said current optimized product sequence is the same version as a version of a future first group of said future optimized product sequence.

11. The method for preventing computer down time as recited in step 1, wherein said consumer products are vehicles.

12. The method for preventing computer down time as recited in step 1, wherein said at least two versions comprise paint colors.

13. A method for preventing computer down time comprising the steps of:
analyzing a current portion of a product order sequence using a primary computer to determine a current number of different colors of a vehicle included in said current portion, wherein said current portion includes at least two colors of said vehicles;
sorting said current portion of said product order sequence using said primary computer to generate a current optimized product sequence, whereby each of said current number of different colors are grouped together;
painting said vehicles in the order determined by said current optimized product sequence;
purging paint between said at least two colors;
resorting said current optimized product sequence back into said product order sequence using said primary computer;
producing goods in said product order sequence;
monitoring a status of a secondary computer to determine functionality of said secondary computer;
updating a secondary computer to a primary computer state when said secondary computer is functional, whereby said secondary computer is capable of replacing said primary computer; and
updating said primary computer to a primary computer state when said secondary computer is not functional.

14. A method for preventing computer down time comprising the steps of:
offering a plurality of consumers thirteen different colors for a vehicle;
collecting a plurality of orders for said vehicle from said plurality of consumers;
generating a product build order sequence based upon said plurality of orders using a primary computer;
dividing said plurality of orders by paint color using said primary computer;
sorting said plurality of orders into groups based on paint color using said primary computer;
painting said vehicles in the order determined by said current optimized product sequence;
purging paint between said current number of different colors;
resorting said current optimized product sequence back into said product order sequence using said primary computer;
producing goods in said product order sequence;
monitoring a status of a secondary computer to determine functionality of said secondary computer;
updating a secondary computer to a primary computer state when said secondary computer is functional, whereby said secondary computer is capable of replacing said primary computer; and
updating said primary computer to a primary computer state when said secondary computer is not functional.

15. The method for preventing computer down time as recited in step 14, wherein a color of a current first group of said current optimized product sequence is the same color as a color of a past final group of a past optimized product sequence.

16. The method for preventing computer down time as recited in step 14, wherein a color of a current final group of said current optimized product sequence is the same color as a color of a future first group of a future optimized product sequence.

* * * * *